United States Patent
Sano

(10) Patent No.: US 6,817,954 B2
(45) Date of Patent: Nov. 16, 2004

(54) GOLF CLUB GRIP

(75) Inventor: Yoshinori Sano, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 10/352,936

(22) Filed: Jan. 29, 2003

(65) Prior Publication Data

US 2003/0176577 A1 Sep. 18, 2003

(30) Foreign Application Priority Data

Mar. 11, 2002 (JP) ........................................ 2002-064619

(51) Int. Cl.$^7$ .............................................. A63B 53/00
(52) U.S. Cl. ...................... 473/282; 473/300; 525/179; 525/184
(58) Field of Search ................. 525/184, 179; 473/282, 300

(56) References Cited

U.S. PATENT DOCUMENTS 5,948,503 A * 9/1999 Yamamoto et al. ......... 428/113

FOREIGN PATENT DOCUMENTS

| JP | 6-246022 A | 9/1994 |
| JP | 6-269523 A | 9/1994 |
| JP | 8-156140 A | 6/1996 |
| JP | 9-192276 A | 7/1997 |

OTHER PUBLICATIONS

Yamamoto, Shinji et al, Nihon Reoroji Gakkaishi, 1997, vol. 5, No. 25, pp. 275–282.

* cited by examiner

*Primary Examiner*—Ana Woodward
(74) *Attorney, Agent, or Firm*—Birch, Stewart, Kolasch & Birch, LLP

(57) ABSTRACT

A golf grip is formed by the crosslinking of a rubber composition obtained through the kneading of a base rubber and a rubber-polyolefin-nylon ternary copolymer. This ternary copolymer is obtained by the graft polymerization of a rubber component, a polyolefin component and a nylon component. This ternary copolymer is a fine fiber reinforced composite having fine nylon fibers dispersed in a matrix composed of the rubber component and the polyolefin component. The amount of the rubber-polyolefin-nylon ternary copolymer to be blended is from 1 part by weight to 50 parts by weight on the basis of 100 parts by weight of the base rubber.

6 Claims, 2 Drawing Sheets

GOLF CLUB GRIP

This nonprovisional application claims priority under 35 U.S.C. § 119(a) on Patent Application No. 2002-064619 filed in JAPAN on Mar. 11, 2002, which is herein incorporated by reference.

BACKGROUND OF THE INVENTION

1. Field of the Invention

The present invention relates to grips for golf clubs, and more particularly relates to grips made of a cross linked rubber.

2. Description of the Related Art

Although previous grips for mounting on golf clubs were fabricated using leather, grips made of a rubber have been predominantly employed in recent years. Grips made of a rubber can be more readily manufactured, exhibit more excellent water resistance, and are more easily mounted on golf clubs in comparison with grips fabricated with leather. Typical examples of rubbers for use in the grips made of a rubber include natural rubbers, styrene-butadiene copolymers, ethylene-propylene-diene copolymers and polybutadiene.

Golfers prefer grips exhibiting a feel which fits the hands while gripping. Such a feel is described by golfers as a "fit feel". A fit feel can be improved by using a rubber which has a low hardness. However, grips having low hardness are liable to deform during the swing motion. Significant deformation of the grip may lead to a deterioration in the swing form. In addition, grips having low hardness are apt to become abraded. Accordingly, golfers desire grips which provide a favorable steady feel as well as a fit feel, and exhibit excellent abrasion resistance.

JP-A-246022/1994 discloses a grip made of a rubber having JIS-A hardness in the range of from 35 to 55. JP-A-269523/1994 discloses a grip made of a rubber blended with a specific polymer. JP-A-156140/1996 discloses a grip made of a rubber blended with a tackifier and short fibers. JP-A-192276/1997 discloses a grip made of a rubber, having a laminated structure with a body and a member having a material which differs from that for the body.

These grips of the prior art have advantages and disadvantages respectively. Under such circumstances, there has not yet been provided a grip which is satisfactory in all areas of fit feel, steady feel and abrasion resistance.

SUMMARY OF THE INVENTION

A grip for a golf club according to the present invention is formed by the crosslinking of a rubber composition. This rubber composition is obtained through kneading a base rubber and a rubber-polyolefin-nylon ternary copolymer. The amount of the rubber-polyolefin-nylon ternary copolymer to be blended with the base rubber is from 1 part by weight to 50 parts by weight based on 100 parts by weight of the base rubber. Nylon fibers included in the rubber-polyolefin-nylon ternary copolymer exert a reinforcing effect. The nylon fibers derived from the rubber-polyolefin-nylon ternary copolymer add a stronger binding capacity to the matrix, and can be dispersed with more uniformity in matrix when compared with common reinforcing fibers which are added alone to a base rubber. This grip is excellent in fit feel, steady feel and abrasion resistance. This grip can be easily obtained. A golf club provided with such a grip mounted thereon provides golfers with excellent usability.

Examples of preferable rubber component for use in the rubber-polyolefin-nylon ternary copolymer include natural rubber component, polyisoprene component, ethylene-propylene-diene copolymer component and hydrogenated acrylonitrile-butadiene copolymer component. Two or more rubber components may be used in combination. These rubber components are hard to gelate upon formation of the rubber-polyolefin-nylon ternary copolymer.

Examples of preferable polyolefin component for use in the rubber-polyolefin-nylon ternary copolymer include a low density polyethylene component, a high density polyethylene component and a polypropylene component. Two or more polyolefin components may be used in combination. Because these polyolefin components have a crystallizing ability, they promote the reinforcing effect of the nylon fibers.

Examples of a preferable nylon component for use in the rubber-polyolefin-nylon ternary copolymer include a nylon-6 component and a nylon-66 component. Both of these may be used in combination. By using such nylon components, the rubber-polyolefin-nylon ternary copolymer can be readily prepared at a low cost.

DESCRIPTION OF THE PREFERRED EMBODIMENTS

The present invention is hereinafter described in detail with appropriate references to the accompanying drawing according to the preferred embodiments of the present invention.

Figure 1:
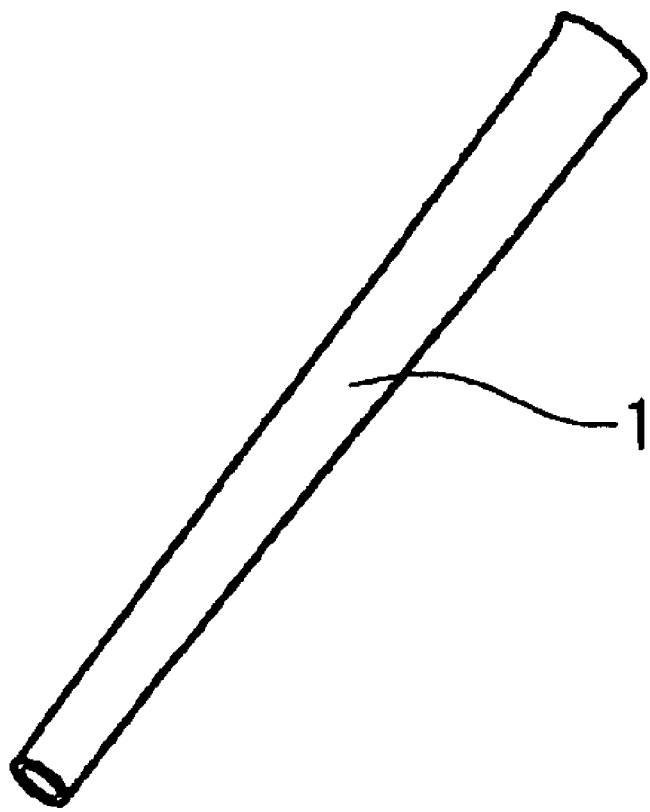
FIG. 1 is a perspective view illustrating a grip according to one embodiment of the present invention.
Figure 2:
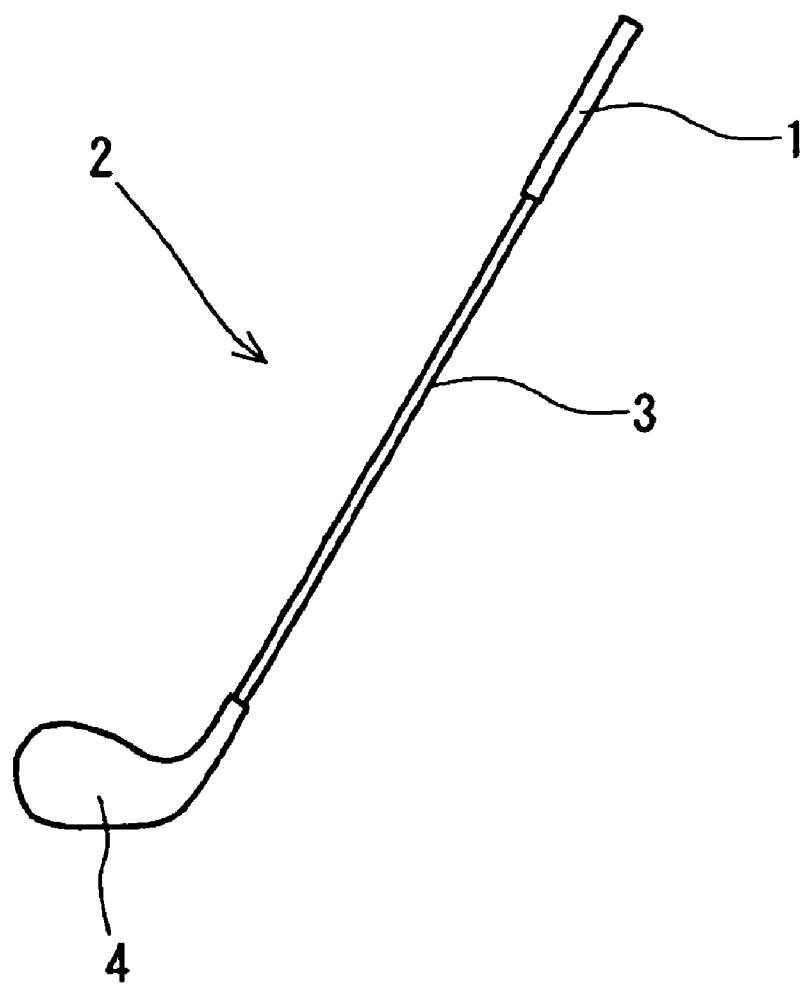
FIG. 2 is a perspective view illustrating a golf club where the grip shown in FIG. 1 is employed.

A grip 1 shown in FIG. 1 has a cylindrical shape with the rear end thereof being closed, and the external diameter of the grip 1 gradually increases in a direction from the anterior end toward the rear end. FIG. 2 shows a golf club 2 where the grip 1 shown in FIG. 1 is employed. As shown in this FIG. 2, the grip 1 receives the rear end part of a shaft 3 fitted therein. A head 4 is mounted in the vicinity of the anterior end of the shaft 3. The shaft 3 may be made of stainless steel, or of a carbon fiber reinforced resin, The head 4 may be a head for a wood type club, or that for an iron type club. Examples of the material for the head 4 include stainless steel, aluminum alloy, titanium alloy, magnesium alloy, fiber reinforced synthetic resin, persimmon and the like.

Grip 1 is formed by the crosslinking of a rubber composition. As a base rubber for use in the rubber composition, polybutadiene, polyisoprene, styrene-butadiene copolymer, acrylonitnie-butadiene copolymer, polychloroprene, ethylene-propylene copolymer, ethylene-propylene-diene copolymer, isobutylene-isoprene copolymer (butyl rubber), acryl rubber or natural rubber is suitably used. Two or more of these rubbers may be used in combination.

The rubber composition is obtained through kneading the base rubber and a rubber-polyolefin-nylon ternary copolymer. This ternary copolymer is obtained by graft polymerization of a rubber component, a polyolefin component and a nylon component. This ternary complex is a fine fiber reinforced composite having fine nylon fibers dispersed in a matrix composed of a rubber component and a polyolefin component. This ternary complex is disclosed in an article "New Type of Fine Fiber Reinforced Rubber Composites Prepared from Rubber/Polyolefin/Nylon Graft Copolymer" in NIHON REOROJI GAKKAISHI Vol. 25, 275–282 (1997).

When a base rubber and a rubber-polyolefin-nylon ternary copolymer is kneaded, the kneading temperature is set to be higher than the softening point of the polyolefin component and lower than the softening point of the nylon component. Upon kneading, phase transition occurs between the base rubber and the polyolefin component, and thus the polyolefin component is dispersed in the base rubber. Through crosslinking of this rubber composition, the grip 1 is obtained which is reinforced by fine nylon fibers dispersed in the matrix. On behalf of the reinforcing effect of the nylon fibers, abrasion resistance of the grip 1 is improved. Nylon fibers are also responsible for the improved steady feel of the grip 1. Because the nylon fibers are fine, and are uniformly dispersed, the fit feel of the grip 1 is not impaired. Thus, this grip 1 is excellent in all terms of a fit feel, a steady feel and abrasion resistance.

The kneading temperature of the base rubber and the rubber-polyolefin-nylon ternary copolymer is preferably higher than the softening point of the polyolefin component by 5° C. or greater, and particularly, by 15° C. or greater. Further, the kneading temperature is preferably lower than the softening point of the nylon component by 5° C. or greater, and particularly, by 15° C. or greater. In light of easy control of the kneading temperature, it is preferred that the rubber-polyolefin-nylon ternary copolymer is used comprising the polyolefin component and the nylon component having different softening temperatures by 10° C. or greater, and particularly, by 30° C. or greater. The term "softening point" herein refers to Vicat softening temperature measured in conformity with the regulation of "JIS K 6924-2".

Exemplary process for manufacturing a rubber-polyolefin-nylon ternary copolymer is explained below. For manufacturing the ternary copolymer, a rubber, polyolefin and a reactant are first kneaded in an internal kneading machine to give a reaction product. In this reaction product, the polyolefin forms a matrix, and the rubber forms a domain. Next, this reaction product, nylon and a reactant are kneaded in a biaxial extruder to give a ternary composite comprising the rubber component, the polyolefin component and the nylon component. In this ternary composite, nylon particles are dispersed in a matrix composed of the rubber component and polyolefin component. The diameter of the nylon particle is usually from $2 \mu m$ to $3 \mu m$. Next, the ternary composite is extruded through a nozzle of the biaxial extruder while being subjected to draft so that a strand is obtained (fiber spinning step). In this fiber spinning step, the nylon particles are stretched to yield fibrous forms. The diameter of the nylon fiber is usually from $0.2 \mu m$ to $0.3 \mu m$. A rubber-polyolefin-nylon ternary copolymer is thus obtained.

The amount of the rubber-polyolefin-nylon ternary copolymer to be blended is from 1 part by weight to 50 parts by weight on the basis of 100 parts by weight of the base rubber. When the amount to be blended is less than the above range, abrasion resistance of the grip 1 may become insufficient. In this respect, the amount to be blended is preferably 2 parts by weight or greater, and particularly preferably 5 parts by weight or greater. When the amount is beyond the above range, hardness of the grip 1 may be raised, and the fit feel may become insufficient. In this respect, the amount to be blended is more preferably 30 parts by weight or less, and even more preferably 20 parts by weight or less, and particularly preferably 15 parts by weight or less.

Examples of the rubber component for use in the rubber-polyolefin-nylon ternary copolymer include natural rubber component, polyisoprene component, ethylene-propylene-diene copolymer component and hydrogenated acrylonitrile-butadiene copolymer component. Two or more rubber components may be used in combination. These rubber components are hard to gelate during kneading with nylon and during fiber spinning.

Examples of preferable polyolefin component for use in the rubber-polyolefin-nylon ternary copolymer include low density polyethylene component, high density polyethylene component and polypropylene component. Two or more polyolefin components may be used in combination. These polyolefin components have a crystallizing ability. On behalf of an anchoring effect of crystalline lamella derived from this olefin component, binding between the nylon fiber and the matrix is expected to be strengthened.

Examples of a preferable nylon component for use in the rubber-polyolefin-nylon ternary copolymer include a nylon-6 component and a nylon-66 component. Both of these may be used in combination. By using these nylon components, the rubber-polyolefin-nylon ternary copolymer can be readily prepared at a low cost.

The amount of the polyolefin component in the rubber-polyolefin-nylon ternary copolymer is preferably from 20 parts by weight to 130 parts by weight on the basis of 100 parts by weight of the rubber component. When the amount of the polyolefin component is less than the above range, the anchoring effect resulting from the microcrystal of polyolefin may be reduced, and thus crack resistance of the grip 1 may become insufficient. In this respect, the amount of the polyolefin component is preferably 35 parts by weight or greater. When the amount of the polyolefin component is beyond the above range, dispersibility in the base rubber may become insufficient. In this respect, the amount of the polyolefin component is preferably 110 parts by weight or less.

The amount of the nylon component in the rubber-polyolefin-nylon ternary copolymer is preferably from 50 parts by weight to 150 parts by weight on the basis of 100 parts by weight of the rubber component. When the amount of the nylon component is less than the above range, the steady feel and abrasion resistance of the grip 1 may become insufficient. In this respect, the amount of the nylon component is preferably 60 parts by weight or greater. When the amount of the nylon component is beyond the above range, the fit feel of the grip 1 may become insufficient. In this respect, the amount of the nylon component is preferably 120 parts by weight or less.

Specific examples of preferable rubber-polyolefin-nylon ternary copolymer include "SHP (trade name)" series commercially available from Daiwa Polymer Co., Ltd. Illustrative grade names of "SHP" series include those listed in Table 1 below.

TABLE 1

SHP series

| Grade name | Composition | Composition ratio |
|---|---|---|
| PA3060 | EPDM/PP/Nylon 6 | 100/100/100 |
| HA1060 | NR/HDPE/Nylon 6 | 100/75/87 |
| LA1060 | NR/LDPE/Nylon 6 | 100/75/87 |
| LA3080 | EPDM/LDPE/Nylon 6 | 100/40/105 |
| LA5060 | H-NBR/LDPE/Nylon 6 | 100/100/100 |
| Z040NB | NBR/LDPE/Nylon 6 | 100/75/75 |

EPDM: ethylene-propylene-diene ternary copolymer
NR: natural rubber
H-NBR: hydrogenated acrylonitrile-butadiene copolymer
NBR: acrylonitrile-butadiene copolymer
PP: polypropylene
HDPE: high density polyethylene
LDPE: low density polyethylene EPDM: ethylene-propylene-diene ternary copolymer
NR: natural rubber
H-NBR: hydrogenated acrylonitrile-butadiene copolymer
NBR: acrylonitrile-butadiene copolymer
PP: polypropylene
HDPE: high density polyethylene
LDPE: low density polyethylene Although mode of crosslinking or the rubber composition is not particularly limited, sulfur crosslinking is usually adopted. The amount of the sulfur to be blended is preferably from 0.5 part by weight to 5.0 parts by weight on the basis of 100 parts by weight of the base rubber. When the amount to be blended is less than the above range, abrasion resistance of the grip 1 may become insufficient. In this respect, the amount to be blended is more preferably 1.0 part by weight or greater, and particularly preferably 1.5 parts by weight or greater. When the amount to be blended is beyond the above range, the fit feel of the grip 1 may be impaired. In this respect, the amount to be blended is more preferably 4.0 parts by weight or less, and preferably 3.5 parts by weight or less.

It is preferred that oil is blended in the rubber composition. Examples of preferred oil include mineral oil such as paraffin oil, naphthene oil, aromatic oil and the like. The amount of oil to be blended is preferably from 5 parts by weight to 60 parts by weight on the basis of 100 parts by weight of the base rubber. When the amount to be blended is less than the above range, the fit feel of the grip 1 may be impaired. In this respect, the amount to be blended is more preferably 10 parts by weight or greater, and particularly preferably 15 parts by weight or greater. When the amount to be blended is beyond the above range, adhesiveness may be provided on the surface of the grip 1. In this respect, the amount to be blended is more preferably 55 parts by weight or less, and particularly preferably 50 parts by weight or less.

For the purpose of improving strength, it is preferred that carbon black is blended in the rubber composition. The amount of carbon black to be blended is preferably from 0.3 part by weight to 20 parts by weight on the basis of 100 parts by weight of the base rubber. When the amount to be blended is less than the above range, abrasion resistance of the grip 1 may be insufficient. In this respect, the amount to be blended is more preferably 0.5 part by weight or greater, and particularly preferably 0.8 part by weight or greater. When the amount to be blended is beyond the above range, the fit feel of the grip 1 may be impaired. In this respect, the amount to be blended is more preferably 15 parts by weight or less, and particularly preferably 10 parts by weight or less. For the purpose of improving strength, an inorganic filler such as silica, zinc oxide, calcium carbonate, clay and the like is preferably blended in place of carbon black, or together with carbon black.

Vulcanization accelerator, anti-aging agent, coloring agent, processing aiding agent and the like may be blended in the rubber composition as needed.

Hardness of the grip 1 is preferably from 40 to 60. When the hardness is less than the above range, the steady feel of the grip 1 may be impaired. In this respect, hardness is more preferably 45 or greater. When the hardness is beyond the above range, the fit feel of the grip 1 may be impaired. In this respect, hardness is more preferably 55 or less. Hardness is measured in conformity with the regulation of "JIS K 6253" by a spring hardness meter type A. For the measurement, a specimen for a micro test (a sheet having a thickness of 2 mm) which was excised from the grip 1 is used.

On the outer surface of the grip 1, there are grooves formed to give a predetermined pattern, although not shown in FIG. 1. By means of these grooves, formation of an aqueous film between golfer's hand and the grip 1 is suppressed, thereby improving an anti-slipping property in a wet condition of the grip 1. For the purpose of improving the anti-slipping property, degree of surface roughness of the grip 1 may be adjusted by grinding of the surface.

EXAMPLES

Example 1

85 parts by weight of a natural rubber, 6 parts by weight of polybutadiene (trade name "BR-11" of JSR Corporation), 9 parts by weight of a styrene-butadiene copolymer (trade name "Nipol NS-116" of ZEON Corporation), 2 parts by weight of a rubber-polyolefin-nylon ternary copolymer (trade name "SHP LA1060" described above), 40 parts by weight of paraffin oil (trade name "PW380" of Idemitsu Kosan Co., Ltd.), 1.5 parts by weight of 2,6-di-tert-butyl-4-methylphenol (trade name "Nocrac 200" of Ouchi Shinko Chemical Industrial Co., Ltd.) as an anti-aging agent, 1.2 parts of carbon black (trade name "Diablack I" of Mitsubishi Kasei Corporation), 14 parts by weight of silica (trade name "Nipsil VN3" of Nippon Silica Industrial Co., Ltd.), 3 parts by weight of zinc oxide (trade name "Ginrei R" of Toho Zinc Corporation) and 2.4 parts of sulfur were kneaded in an internal kneading machine to give a rubber composition. This rubber composition was placed in a mold provided with a known groove pattern on its cavity face. Then, crosslinking reaction was allowed to the rubber over 10 minutes at a temperature of 165° C. to give a grip for a golf club of Example 1.

Examples 2–6 and Comparative Examples 1 and 2

In a similar manner to Example 1 except that amounts of the rubber-polyolefin-nylon ternary copolymer were as presented in Table 2 below, grips of Examples 2–6 and Comparative Examples 1 and 2 were obtained.

Comparative Example 3

In a similar manner to Example 1 except that the rubber-polyolefin-nylon ternary copolymer was not blended and the amount of oil was 12 parts by weight, a grip of Comparative Example 3 was obtained.

Comparative Example 4

Fifty parts by weight of a natural rubber, 20 parts by weight of a styrene-butadiene copolymer ("NS-116" described above), 30 parts by weight of an ethylene-propylene-diene copolymer (trade name "EPT4045" of Mitsui Petrochemical Industries, Ltd.), 3 parts by weight of a master batch (trade name "FRR100" of Ube Industries, Ltd.) comprising EPDM and nylon fine fibers admixed at a weight ratio of 2:1, 50 parts by weight of a tackifier (trade name "Nisseki polybutene HV-100" of Nippon Petrochamicals Co., Ltd.), 6 parts by weight of paraffin oil ("PW380" described above), 1.0 part by weight of 2,6-di-tert-butyl-4-methylphenol ("Nocrac 200" described above) as an anti-aging agent, 5.0 parts of carbon black ("Diablack I" described above), 50 parts by weight of silica (trade name "Nipsil VN3" described above), 5 parts by weight of zinc oxide ("Ginrei R" described above) and 2.0 parts of sulfur were kneaded in an internal kneading machine to give a rubber composition. This rubber composition was placed in a mold provided with a known groove pattern on its cavity face. Then, crosslinking reaction was allowed to the rubber over 10 minutes at a temperature of 165° C. to give a grip for a golf club of Comparative Example 4.

[Evaluation of Abrasion Resistance]

Surface of the grip was subjected to abrasion with a gakushin type abrasion testing machine using a #400 abrasive paper in place of a white cotton cloth in conformity with the regulation of "JIS L 0849". The abrasion amount yielded throughout 1,000 times sliding of the grip on the abrasive paper is presented in Table 2 below. In this Table 2, the abrasion amounts are indicated as indices calculated on the basis of the abrasion amount for Comparative Example 1 which was converted as 100.

[Practical use Test]

Using a golf club having the grip mounted thereto, golf balls were hit by 30 golfers who were on the average level. Then, a fit feel and a steady feel were evaluated. The results are presented in Table 2 below.

TABLE 2

| | Results of evaluation | | | | | | | | | |
|---|---|---|---|---|---|---|---|---|---|---|
| | Comparative Example 1 | Example 1 | Example 2 | Example 3 | Example 4 | Example 5 | Example 6 | Comparative Example 2 | Comparative Example 3 | Comparative Example 4 |
| Natural rubber | 85 | 85 | 85 | 85 | 85 | 85 | 85 | 85 | 85 | 50 |
| Polybutadiene | 6 | 6 | 6 | 6 | 6 | 6 | 6 | 6 | 6 | — |
| Styrene-butadiene copolymer | 9 | 9 | 9 | 9 | 9 | 9 | 9 | 9 | 9 | 20 |
| EPDM | — | — | — | — | — | — | — | — | — | 30 |
| LA1060 | — | 2 | 5 | 15 | 20 | 30 | 50 | 55 | — | — |
| FRR100 | — | — | — | — | — | — | — | — | — | 3 |
| Tackifier | — | — | — | — | — | — | — | — | — | 50 |
| Paraffin oil | 40 | 40 | 40 | 40 | 40 | 40 | 40 | 40 | 12 | 6 |
| Anti-aging agent | 1.5 | 1.5 | 1.5 | 1.5 | 1.5 | 1.5 | 1.5 | 1.5 | 1.5 | 1.0 |
| Carbon black | 1.2 | 1.2 | 1.2 | 1.2 | 1.2 | 1.2 | 1.2 | 1.2 | 1.2 | 5.0 |
| Silica | 14 | 14 | 14 | 14 | 14 | 14 | 14 | 14 | 14 | 50 |
| Zinc oxide | 3 | 3 | 3 | 3 | 3 | 3 | 3 | 3 | 3 | 5 |
| Sulfur | 2.4 | 2.4 | 2.4 | 2.4 | 2.4 | 2.4 | 2.4 | 2.4 | 2.4 | 2.0 |
| Hardness (JIS A) | 43 | 50 | 50.5 | 51 | 52 | 53 | 55 | 57 | 51 | 52 |
| Abrasion amount (index) | 100 | 80 | 83 | 85 | 87 | 90 | 91 | 95 | 95 | 95 |
| Fit feel | A | A | A | A | A | A | B | C | C | A |
| Steady feel | B | A | A | A | A | A | A | A | B | A |

As shown in Table 2, the grip of each of the Examples yielded small amount of abrasion, and evaluations for a fit feel and a steady feel fall within a high level. Accordingly, advantages of the present invention are clearly indicated by these results of evaluation.

The description herein above is merely for illustrative examples, and therefore, various modifications can be made without departing from the principles of the present invention.

What is claimed is:

1. A grip for a golf club which comprises a crosslinked rubber composition of 100 parts by weight of a base rubber arid from 1 part by weight to 50 parts by weight of a rubber-polyolefin-nylon ternary composite comprising nylon particles dispersed in a matrix composed of the rubber component and the polyolefin component.

2. The grip according to claim 1 wherein the rubber component of said rubber-polyolefin-nylon ternary composite is at least one member selected from the group consisting of a natural rubber component, a polyisoprene component, ethylene-propylene-diene copolymer component and a hydrogenated acrylonitrile-butadiene copolymer component.

3. The grip according to claim 1 wherein the polyolefin component of said rubber-polyolefin-nylon ternary composite is at least one member selected from the group consisting of a low density polyethylene component, a high density polyethylene component and a polypropylene component.

4. The grip according to claim 1 wherein the nylon component of said rubber-polyolefin-nylon ternary composite is at least one member selected from the group consisting of a nylon-6 component and a nylon-66 component.

5. The golf club of claim 1 wherein the polyolefin compound of the ternary composite is derived from an olefin having single unsaturation.

6. A golf club containing a shaft, a head mounted in the vicinity of the anterior end of said shaft, and a grip mounted on the rear end of said shaft, wherein said grip comprises a rubber composition of 100 parts by weight of a base rubber and from 1 part by weight to 50 parts by weight of a rubber-polyolefin-nylon ternary composite comprising nylon particles dispersed in a matrix composed of the rubber component and the polyolefin component.

* * * * *

UNITED STATES PATENT AND TRADEMARK OFFICE
CERTIFICATE OF CORRECTION

PATENT NO. : 6,817,954 B2
DATED : November 16, 2005
INVENTOR(S) : Yoshinori Sano It is certified that error appears in the above-identified patent and that said Letters Patent is hereby corrected as shown below:

<u>Column 8,</u>
Line 52, should read -- 1. A grip for a golf club which comprises a crosslinked rubber composition of 100 parts by weight of a base rubber and from 1 part by weight to 50 parts by weight of a rubber-polyolefin-nylon ternary composite comprising nylon particles dispersed in a matrix composed of the rubber component and the polyolefin component. --

Signed and Sealed this

Third Day of May, 2005

JON W. DUDAS
*Director of the United States Patent and Trademark Office*